(12) United States Patent
Yamachika (10) Patent No.: US 10,014,630 B1
(45) Date of Patent: Jul. 3, 2018

(54) CARD CONNECTOR

(71) Applicant: HOSIDEN CORPORATION, Yao-shi, Osaka (JP)

(72) Inventor: Naoki Yamachika, Yao (JP)

(73) Assignee: Hosiden Corporation, Yao-Shi, Osaka (JP)

( * ) Notice: Subject to any disclaimer, the term of this patent is extended or adjusted under 35 U.S.C. 154(b) by 0 days.

(21) Appl. No.: 15/577,909

(22) PCT Filed: Jun. 10, 2016

(86) PCT No.: PCT/JP2016/067350
§ 371 (c)(1),
(2) Date: Nov. 29, 2017

(87) PCT Pub. No.: WO2016/199888
PCT Pub. Date: Dec. 15, 2016

(30) Foreign Application Priority Data

Jun. 12, 2015 (JP) .................... 2015-119652

(51) Int. Cl.
*H01R 13/62* (2006.01)
*H01R 13/635* (2006.01)
*H01R 13/639* (2006.01)
*H01R 12/71* (2011.01)

(52) U.S. Cl.
CPC ......... *H01R 13/635* (2013.01); *H01R 12/716* (2013.01); *H01R 13/639* (2013.01)

(58) Field of Classification Search
CPC .. H01R 13/629; H01R 13/633; H01R 13/635; H01R 13/639; H01R 12/716
USPC .................................................. 439/152, 153
See application file for complete search history.

(56) References Cited

U.S. PATENT DOCUMENTS 7,118,394 B2 * 10/2006 Yoneyama ............. G06K 13/08
439/159
2005/0272290 A1 12/2005 Yoneyama et al.

FOREIGN PATENT DOCUMENTS

| JP | 2006100210 A | 4/2006 |
| JP | U3135262 | 9/2007 |
| JP | 2010165139 A | 7/2010 |

(Continued)

OTHER PUBLICATIONS

International Search Report (Form PCT/ISA/210) for International Patent Application No_ PCT/JP2016/067350, issued from the Japan Patent Office, dated Aug. 30, 2016, 5 pages.

*Primary Examiner* — Khiem Nguyen
(74) *Attorney, Agent, or Firm* — Kilyk & Bowersox, P.L.L.C.

(57) ABSTRACT

A card connector including a body, a slider, a lock spring, and an urging member. The body includes a movement path and an abuttable portion. The slider is movable in Y-Y' direction inside the movement path. The lock spring is provided at the slider 300 and is movable in the same direction. An engaging portion of the lock spring is engageable with an engaging recess of a card. The urging member in the Y direction moves the slider from a first position to a second position and brings the engaging portion into abutment with an inclined face of the abuttable portion. In a state where the slider is located at the second position and the engaging portion abuts the inclined face, a load is exerted from the card to the engaging portion, and the engaging portion is displaced in the X direction along the inclined face.

20 Claims, 9 Drawing Sheets

(56) References Cited

FOREIGN PATENT DOCUMENTS

WO  2005034295 A  4/2005

\* cited by examiner

CARD CONNECTOR

BACKGROUND OF THE INVENTION

Technical Field

The invention relates to card connectors.

Background Art

A conventional card connector is described in Patent Literature 1 identified below. The card connector includes a body, a slider, a lock spring, a first spring, and a second spring. The body has a slot, a movement path, and a rib. The slot is a space in the body for insertion and removal of a card. The movement path is provided next to the slot of the body and extends in the card-insertion/removal-direction of the card. The rib is disposed in the movement path. The slider is provided such as to be slidable in the movement path of the body, together with the card, from a first position to a third position beyond a second position. The slider is located at the second position in the initial state. The second position is located on the card-discharge-direction side relative to the first position. The third position is located on the card-discharge-direction side relative to the second position. The lock spring is provided at the slider and is movable in the insertion/removal direction together with the slider. The lock spring includes an engaging portion engageable with an engaging recess of the card. When the slider is located at the second position, the engaging portion of the lock spring does not abut the rib and therefore can be displaced away from the engaging recess of the card. The displacement of the engaging portion of the lock spring away from the engaging recess of the card causes release of the engagement between the engaging portion of the lock spring and the engaging recess of the card. In contrast, when the slider is located at the third position, the engaging portion of the lock spring abuts the rib of the body, which prevents displacement of the engaging portion of the lock spring away from the engaging recess of the card. When the slider is located at the first position, the first spring applies an urging force to the slider in the discharge direction. When the slider is located at the third position, the second spring elastically contacts the slider to cause the slider to lose momentum and presses the slider back to the second position.

CITATION LIST

Patent Literature

Patent Literature 1: WO 2005/034295

SUMMARY OF INVENTION

Technical Problem

Since the slider is configured to be movable in the discharge direction, beyond the second position and up to the third position, it is difficult to reduce the dimension in the insertion/removal direction of the card connector. In addition, the above card connector has a complicated configuration due to requirement to allow release of the engagement between the lock spring and the engaging recess of the card with the slider located at the second position, and also due to requirement to maintain the engagement between the lock spring and the engaging recess of the card with the slider located at the third position.

The invention has been devised in view of the above circumstances and provides a card connector with a reduced size and a simplified structure.

Solution to Problem

A card connector of an aspect of the invention includes a body, a slider, an urging member, and a lock spring. The body includes a slot, a movement path, and an abuttable portion. A card can be inserted into and removed from the slot along a first direction. The movement path extends in the first direction and is located on one side of a second direction relative to the slot. The second direction crosses the first direction. The abuttable portion is provided inside the movement path and includes an inclined face. The inclined face is inclined in a direction including components of one side of the first direction and the other side of the second direction. The slider is accommodated inside the movement path so as to be movable in the first direction, at least between a first position and a second position. The second position is located on the one side of the first direction relative to the first position. The urging member exerts on the slider an urging force to the one side of the first direction. The lock spring is provided at the slider and movable in the first direction together with the slider. The lock spring includes an engaging portion. The engaging portion is engageable with an engaging recess of the card, from the one side of the second direction. The lock spring is elastically deformable such that the engaging portion thereof is displaced to the one side of the second direction. When the urging force of the urging member causes the slider to move from the first position to the second position, the engaging portion is brought into abutment with the inclined face of the abuttable portion. When a load in a direction including components of the one side of the first direction and the one side of the second direction is exerted on the engaging portion from the card in a state where the slider is located at the second position and the engaging portion abuts the inclined face of the abuttable portion, the engaging portion is displaced to the one side of the second direction along the inclined face.

The card connector of this aspect has the following technical features. First, the conventional card connector described above is configured to prevent the card from springing out by bringing the lock spring into abutment with the rib when the slider is located at the third position that is located on the discharge-direction side relative to the second position. In contrast, the card connector of the invention is configured such that the engaging portion of the lock spring is brought into abutment with the inclined face of the abuttable portion when the slider is located at the second position, so that the slider does not move to the one side of the first direction beyond the second position. Therefore, the card connector of the invention has a reduced dimension in the first direction (the card connector is downsized). Second, the card connector has a simplified construction. This is because this card connector has a simple configuration to allow two operations in a state where the slider is located at the second position: preventing a card from spring-out and removing the card. Specifically, when the urging force of the urging member causes the slider to move to the one side of the first direction (in the card discharge direction), from the first position to the second position, the engaging portion of the lock spring is brought into abutment with the inclined face of the abuttable portion of the body. Since the inclined face is inclined in the direction including the components of the one side of the first direction and the other side of the second direction, a force is generated against the load on the inclined face upon the abutment, and the force acts on the engaging portion in the direction including components of the other side of the first direction and the other side of the second direction. This force prevents displacement of the engaging portion to the one side of the second direction and maintains the engagement of the engaging portion with the engaging recess of the card. The card is thus prevented from springing out of the card connector. In a state where the slider is located at the second position and the engaging portion abuts the inclined face of the abuttable portion, when a load in a direction including components of the one side of the first direction and the one side of the second direction is exerted on the engaging portion from the card, the engaging portion is displaced to the one side of the second direction along the inclined face of the abuttable portion. The displacement results in that the engaging portion goes out of the engaging recess of the card. Therefore, the card can be removed from the slot of the card connector.

The engaging portion may include an inclined portion. The inclined portion may be inclined in a direction that is substantially the same as an inclining direction of the inclined face and be configured to make surface-contact with the inclined face.

In the card connector of this aspect, the engaging portion is easy to be displaced to the one side of the second direction along the inclined face of the abuttable portion when the engaging portion is subjected to a load from a card in the direction including the components of the one side of the first direction and the one side of the second direction. This is because the load from the card is allowed to be transferred more easily from the inclined portion of the engaging portion to the inclined face of the abuttable portion, and the force generated against the load is allowed to act as a force for displacing the engaging portion along the inclined face of the abuttable portion.

The engaging portion may be elastically deformable when brought into abutment with the inclined face of the abuttable portion. In the card connector of this aspect, elastic deformation of the engaging portion mitigates impact occurring when the engaging portion is brought into abutment with the inclined face of the abuttable portion. It should be noted that the engaging portion may be constituted by a flat spring of hook shape. Alternatively, the engaging portion may be constituted by an elastic body of rubber or other material.

DESCRIPTION OF EMBODIMENTS

A card connector C of an embodiment of the invention will be described with reference to FIGS. 1A to 3E. The card connector C is a connector for connection with a card M. These will be described in detail below. It should be noted that the Y-Y' direction indicated in FIGS. 2A to 3E corresponds to the insertion/removal direction of the card M with respect to the card connector C and corresponds to the first direction in the claims. The Y direction corresponds to the discharge direction of the card M and corresponds to one side of the first direction in the claims, and the Y' direction corresponds to the insertion direction of the card M (opposite to the discharge direction) and corresponds to the other side of the first direction. The X-X' direction indicated in FIGS. 2A to 3E orthogonally crosses Y-Y' direction. The X direction corresponds to one side of the second direction in the claims, and the X' direction corresponds to the other side of the second direction in the claims. The Z-Z' direction indicated in FIGS. 2A and 2B orthogonally crosses the Y-Y' and X-X' directions.

The card M is, for example, an IC card, a PC card, a SIM card, an SD card, a mini SD card, or the like. As well illustrated in FIGS. 3A to 3E, the card M includes an engaging recess M1 and a plurality of electrodes (not shown). The engaging recess M1 is provided centrally in the end portion on the X-direction side of the card M. The electrodes are provided on an end face on the Z'-direction side (i.e. bottom face) of the card M.

The card connector C includes a body 100, a plurality of terminals 200, a slider 300, a lock spring 400, and an urging member 500.

Figure 1A:
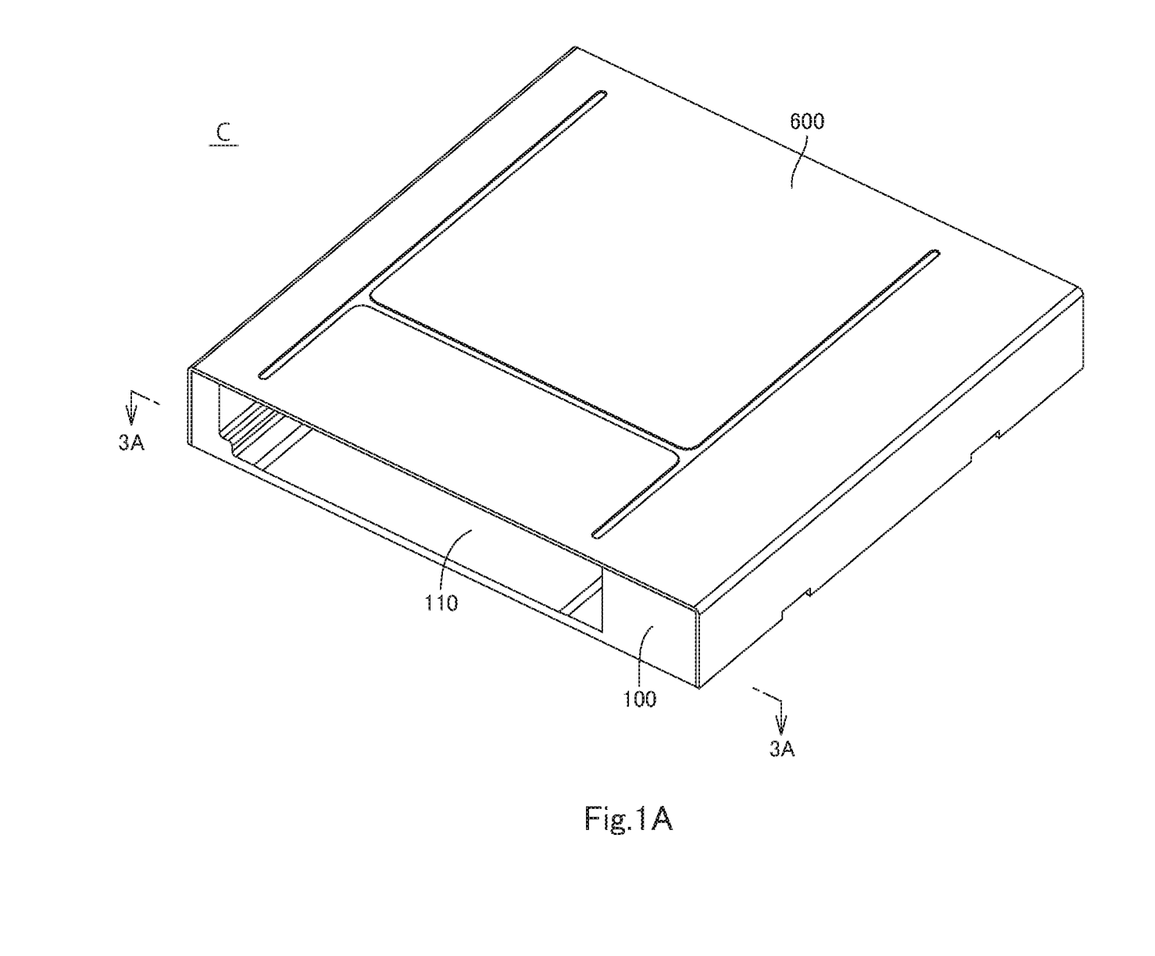
FIG. 1A is a front, top, right side perspective view of a card connector of an embodiment of the invention.
Figure 1B:
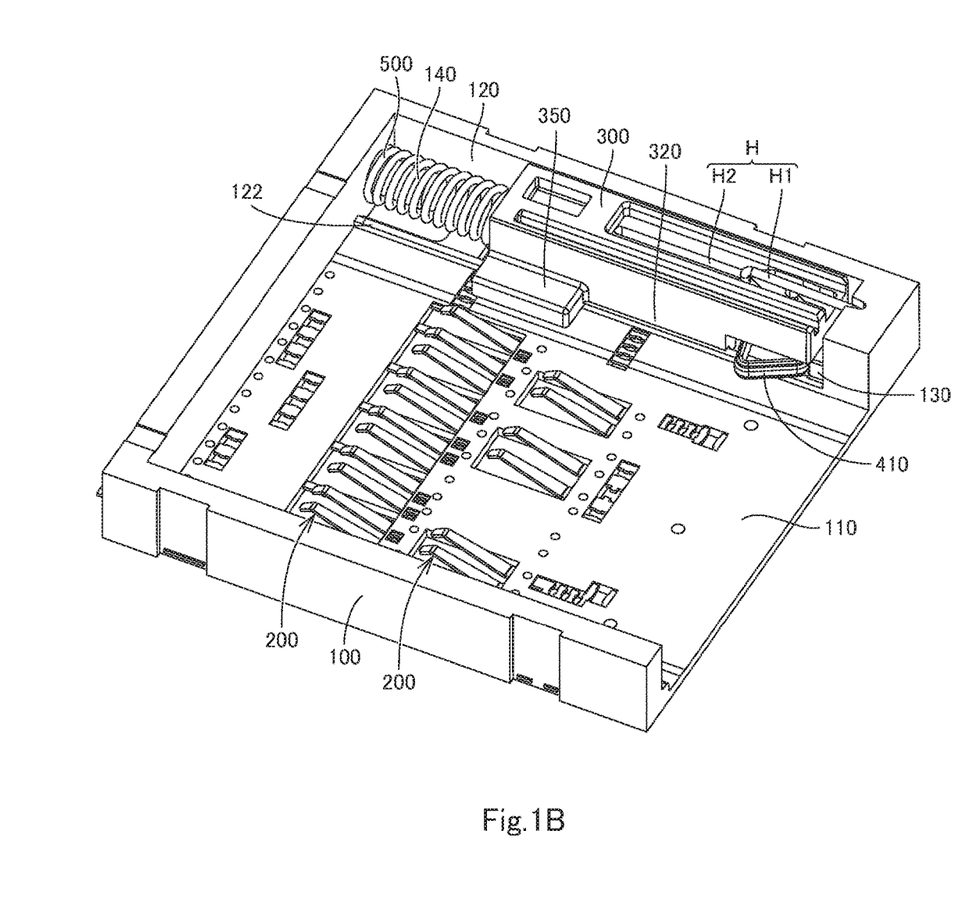
FIG. 1B is a front, top, left side perspective view of a body, a slider, a lock spring, an urging member, and a heart-cam mechanism of the card connector with the slider located at a second position.
Figure 2A:
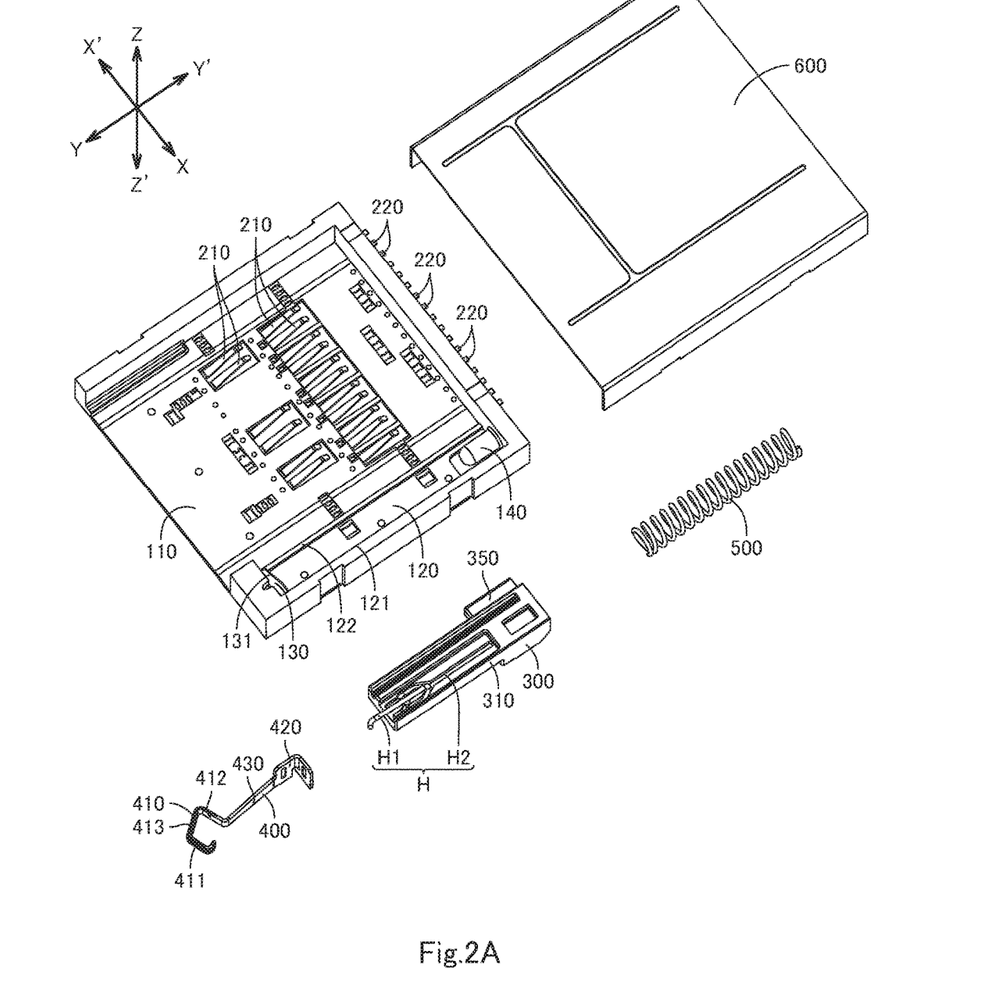
FIG. 2A is a front, top, right side exploded perspective view of the card connector.
Figure 2B:
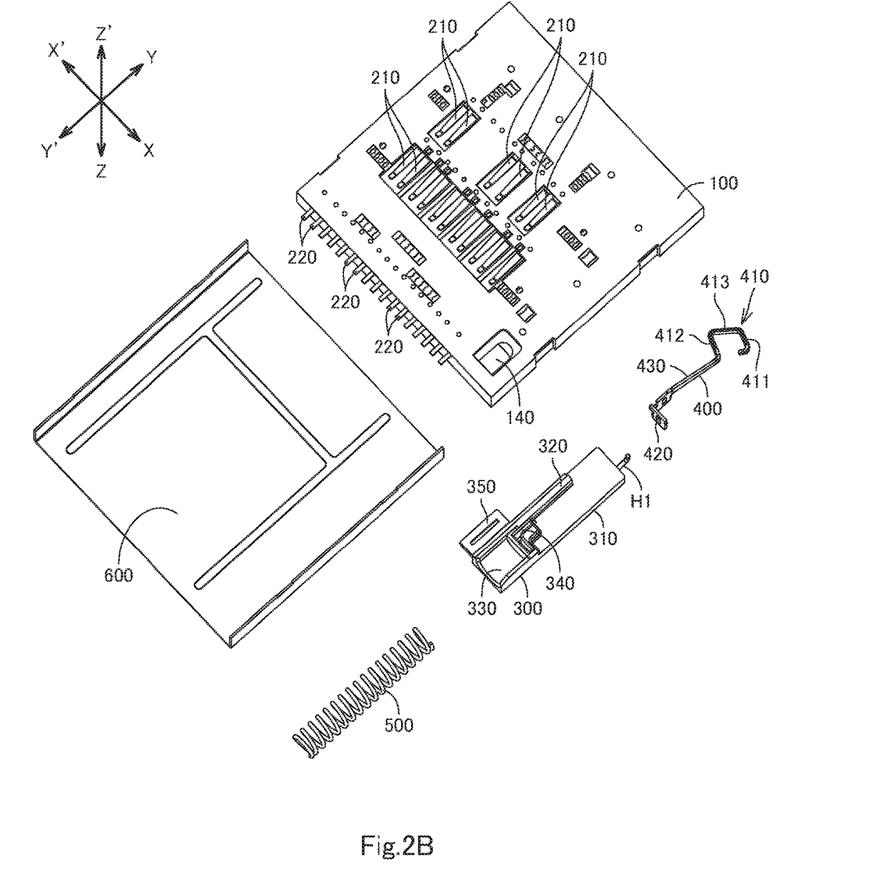
FIG. 2B is a back, bottom, right side exploded perspective view of the card connector.
Figure 3A:
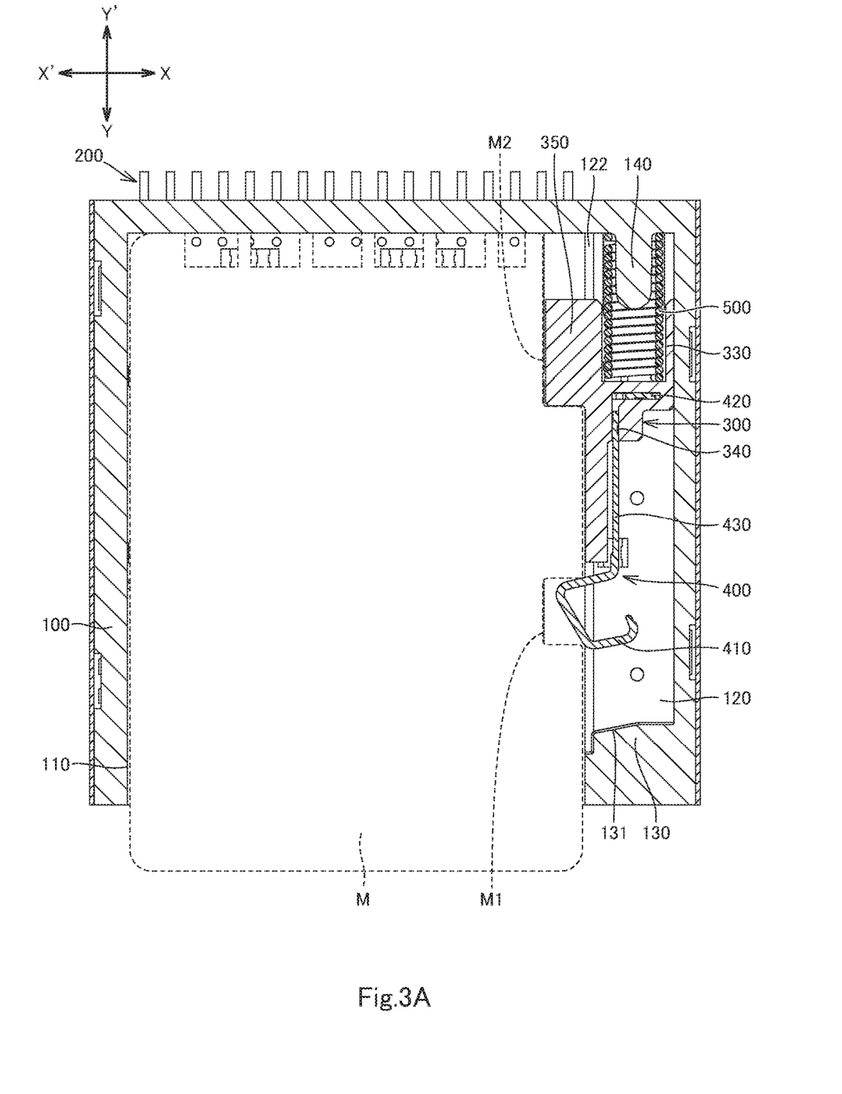
FIG. 3A is a cross-sectional view, taken along line 3A-3A in FIG. 1A, of the card connector and a card with the slider pressed beyond a first position.
Figure 3B:
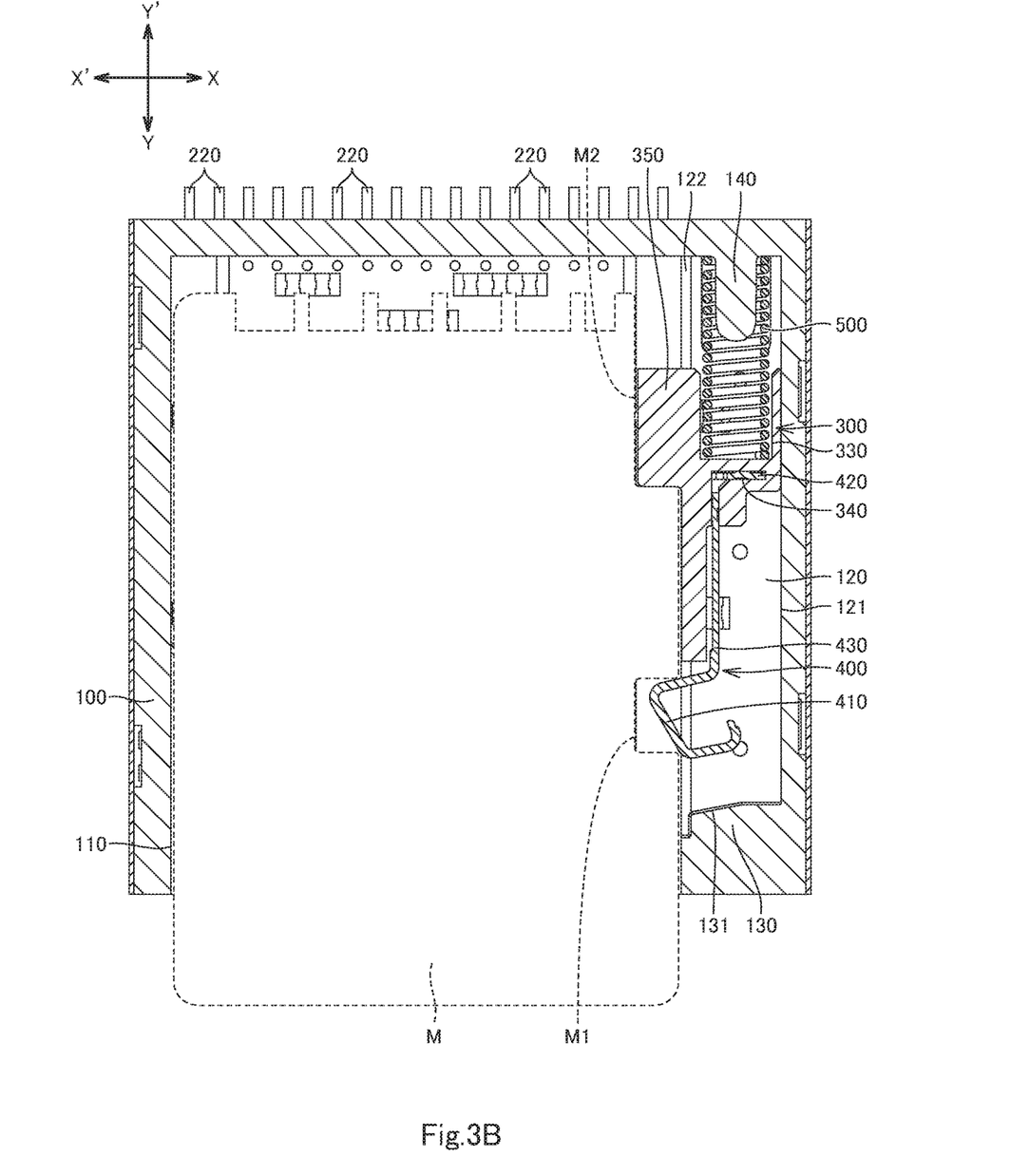
FIG. 3B is a cross-sectional view, taken along line 2A-2A in FIG. 1A, of the card connector and the card received therein with the slider located at the first position.
Figure 3C:
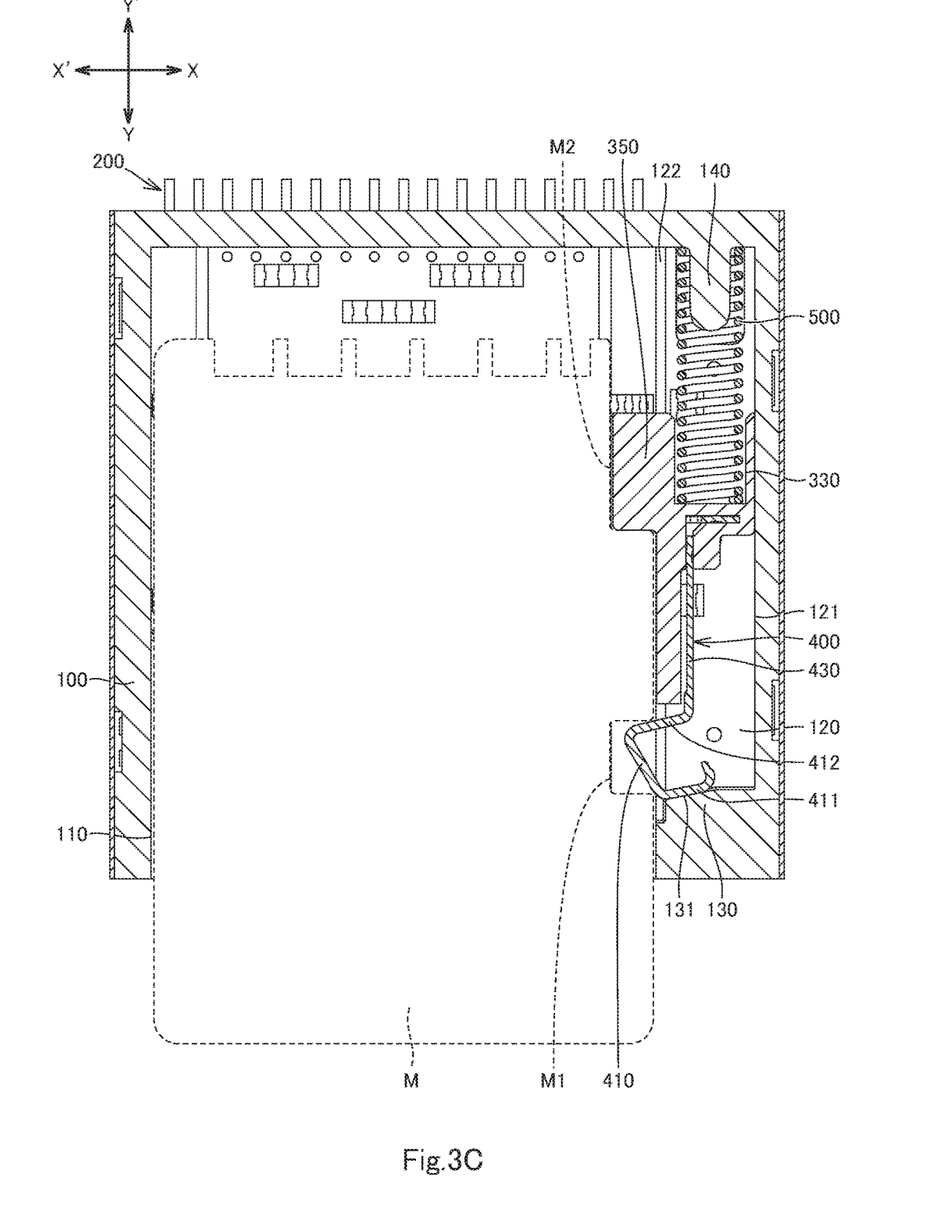
FIG. 3C is a cross-sectional view, taken along line 3A-3A in FIG. 1A, of the card connector and the card with the slider located at the second position.

The body 100 is made of an insulating plastic. The body 100 includes a slot 110. The slot 110 is a recess in the body 100 and extends in the Y-Y' direction. The slot 110 opens at least in the Y direction. The slot 110 may or may not open in the Z direction. The slot 110 has an X-X' direction dimension corresponding to that of the card M. The slot 110 is smaller in Y-Y' direction dimension than the card M. The card M can be inserted into and removed from the slot 110 along the Y-Y' direction. It should be appreciated that FIG. 3B illustrates the card M located at a connection position where the card M is connected to the card connector C. FIG. 3C illustrates the card M located at a discharge position where the card M can be discharged from the slot 110 of the card connector C.

Each of the terminals 200 includes a contact portion 210 and a connection portion 220. The terminals 200 may preferably be held in the body 100 such that the contact portions 210 are located within the slot 110 and the connection portions 220 protrude outwards from the body 100. For example, the terminals 200 may be insert-molded in the body 100, or may be respectively held in holding grooves or holding holes (not shown) in the body 100. The contact portions 210 are arranged in accordance with the positions of the electrodes of the card M as located at the connection position. The connection portions 220 are arranged in accordance with the positions of electrodes of a circuit board (not shown) or other member to mount the card connector C. In FIGS. 1B to 3E, the terminals 200 are insert-molded in the body 100 such that the contact portions 210 are located inside the slot 110 and the connection portions 220 protrude in the Y' direction from the Y' end face of the body 100.

The body 100 further includes a movement path 120. The movement path 120 is provided on the X-direction side relative to the slot 110 of the body 100 and extends in the Y-Y' direction. The movement path 120 communicates with the slot 110. The movement path 120 accommodates the slider 300. The slider 300 is movable, together with the card M, in the Y-Y' direction at least between a first position and a second position in the movement path 120. The first position is the position of the slider 300 when the card M is located at the connection position. The second position, which is on the Y-direction side relative to the first position, is the position of the slider 300 when the card M is located at the discharge position. The second position is also the initial position of the slider 300 when the card M is not inserted.

The movement path 120 may include an X-direction-side guide 121 and an X'-direction-side guide 122. The guide 121 and the guide 122 are only required to guide the slider 300 movably in the Y-Y' direction between the guides 121 and 122. For example, the guide 121 may have any one of the following configurations: an X-direction-side wall face of the movement path 120, a ridge in the movement path 120 extending in the Y-Y' direction, a plurality of protrusions in the movement path 120 at spaced intervals in the Y-Y' direction, or the like. The guide 122 may have any one of the following configurations: an X'-direction-side wall face of the movement path 120, a ridge in the movement path 120 extending in the Y-Y' direction, a plurality of protrusions in the movement path 120 at spaced intervals in the Y-Y' direction, or the like. The guide 122 has a Z-Z' direction dimension that does not interfere with the slider 300 and the lock spring 400. In this case, the movement path 120 and the slot 110 communicate with each other on the Z-direction side relative to the guide 122. Alternatively, the guide 122 may be provided with an opening for avoiding interference with the slider 300 and the lock spring 400. In this case, the movement path 120 and the slot 110 communicate with each other through the opening.

The slider 300 may include an X-direction-side runner 310 and an X'-direction-side runner 320. The runner 310 is only required to be movable in the Y-Y' direction along the guide 121, and the runner 320 is only required to be movable in the Y-Y' direction along the guide 122. For example, the runner 310 may have any one of the following configurations: an X-direction-side end face of the slider 300, a ridge on the slider 300 extending in the Y-Y' direction, a plurality of protrusions on the slider 300 at spaced intervals in the Y-Y' direction, or the like. The runner 320 may have any one of the following configurations: an X'-direction-side end face of the slider 300, a ridge on the slider 300 extending in the Y-Y' direction, a plurality of protrusions on the slider 300 at spaced intervals in the Y-Y' direction, or the like.

In FIGS. 1B to 3E, the guide 121 is the X-direction-side wall face of the movement path 120, and the guide 122 is a ridge being provided at the X'-direction end of the bottom face of the movement path 120 and extending in the Y-Y' direction. The runner 310 is the X-direction-side end face of the slider 300, and the runner 320 is a ridge being provided on the Z'-direction-side face of the slider 300 and extending in the Y-Y' direction.

The urging member 500 is only required to exert on the slider 300 an urging force in the Y direction. For example, the urging member 500 may be a coil spring, a flat spring, a plastic plate, or an elastic body of rubber or other material. The urging member 500 may be disposed in a compressed state between the slider 300 and part of the body 100, or may be positionally fixed in the body 100 so as to be able to urge the slider 300 in the Y direction. The urging member 500 may be disposed inside or outside the movement path 120 of the body 100. In FIGS. 1B and 3A to 3E, the urging member 500 is a coil spring disposed inside the movement path 120 in a compressed state, between the Y'-direction-side wall of the movement path 120 and the slider 300. The Y'-direction-side wall of the movement path 120 is provided with a column 140 received in the urging member 500. The Y'-direction-side end portion of the slider 300 is provided with an accommodating recess 330 for accommodating the Y-direction-side end portion of the urging member 500.

The slider 300 may preferably further include a holding portion 340. The holding portion 340 holds the lock spring 400. The holding portion 340 may be a holding groove or a holding hole for holding the lock spring 400 partly, or may be a portion of the slider 300 in which the lock spring 400 is partly insert-molded. The holding portion 340 may be provided at any position in the slider 300. The holding portion 340 may be provided on the Z'-direction-side face of the slider 300, or may be a part of the Y-direction-side end portion of the slider 300. In FIGS. 2B to 3E, the holding portion 340 includes a block and a holding groove. The block is provided on the X-direction side relative to the runner 320 on the Z'-direction-side face of the slider 300. The holding groove is provided in the block.

The lock spring 400 includes an engaging portion 410. The lock spring 400 is only required to be elastically deformable such that the engaging portion 410 is displaced in the X direction. The lock spring 400 is constituted by a flat spring, plastic, rubber, a combination of a flat spring and plastic, a combination of a flat spring and rubber, a combination of plastic and rubber, a combination of a flat spring, plastic, and rubber, etc. The engaging portion 410 partly protrudes in the X' direction from the slider 300 and is partly located inside the slot 110. The engaging portion 410 is engageable with the engaging recess M1 of the card M.

The body 100 further includes an abuttable portion 130. The abuttable portion 130 is only required to be located inside the movement path 120 and includes an inclined face 131. The abuttable portion 130 may be, for example, a rib inside the movement path 120 or a portion of a wall of the movement path 120. The inclined face 131 is inclined in a direction having components of the Y and X' directions. The inclined face 131 may be flat (level) with respect to the Z-Z' direction, or may be also inclined in either the Z direction or the Z' direction. FIGS. 3A to 3E show the former case. The inclined face 131 of the abuttable portion 130 is a portion of the body 100 that is abuttable on the engaging portion 410 of the lock spring 400 from the Y-direction side when the slider 300 is located at the second position. When the engaging portion 410 is brought into abutment with the inclined face 131, generated is a force against the load exerted on the inclined face 131. Since the inclined face 131 is inclined as described above, this force acts on the engaging portion 410 in a direction having components of the Y' and X' directions. This action prevents displacement in the X direction of the engaging portion 410. When the engaging portion 410 is not engaged with the engaging recess M1 of the card M, the engaging portion 410 is retained in abutment with the inclined face 131 because of the prevention of displacement of the engaging portion 410 and the urging force in the Y direction of the urging member 500. The slider 300 is thus retained at the second position. When the engaging portion 410 is engaged with the engaging recess M1 of the card M, the engagement therebetween is maintained because of the prevention of displacement of the engaging portion 410. The card M is thus prevented from springing out of the slot 110 of the card connector C.

In a state where the slider 300 is located at the second position and the engaging portion 410 abuts the inclined face 131 of the abuttable portion 130 (a state where the above-described force against the load is not generated), when a load in a direction including components in the Y and X direction is exerted on the engaging portion 410 from the Y'-direction-side wall of the engaging recess M1 of the card M, the engaging portion 410 is displaced in the X direction along the inclined face 131 of the abuttable portion 130. The displacement results in that the engaging portion 410 goes out of the engaging recess M1 of the card M and that the engaging portion 410 is disengaged from the engaging recess M1. Thus, the card M can be removed from the slot 110 of the card connector C.

Figure 3D:
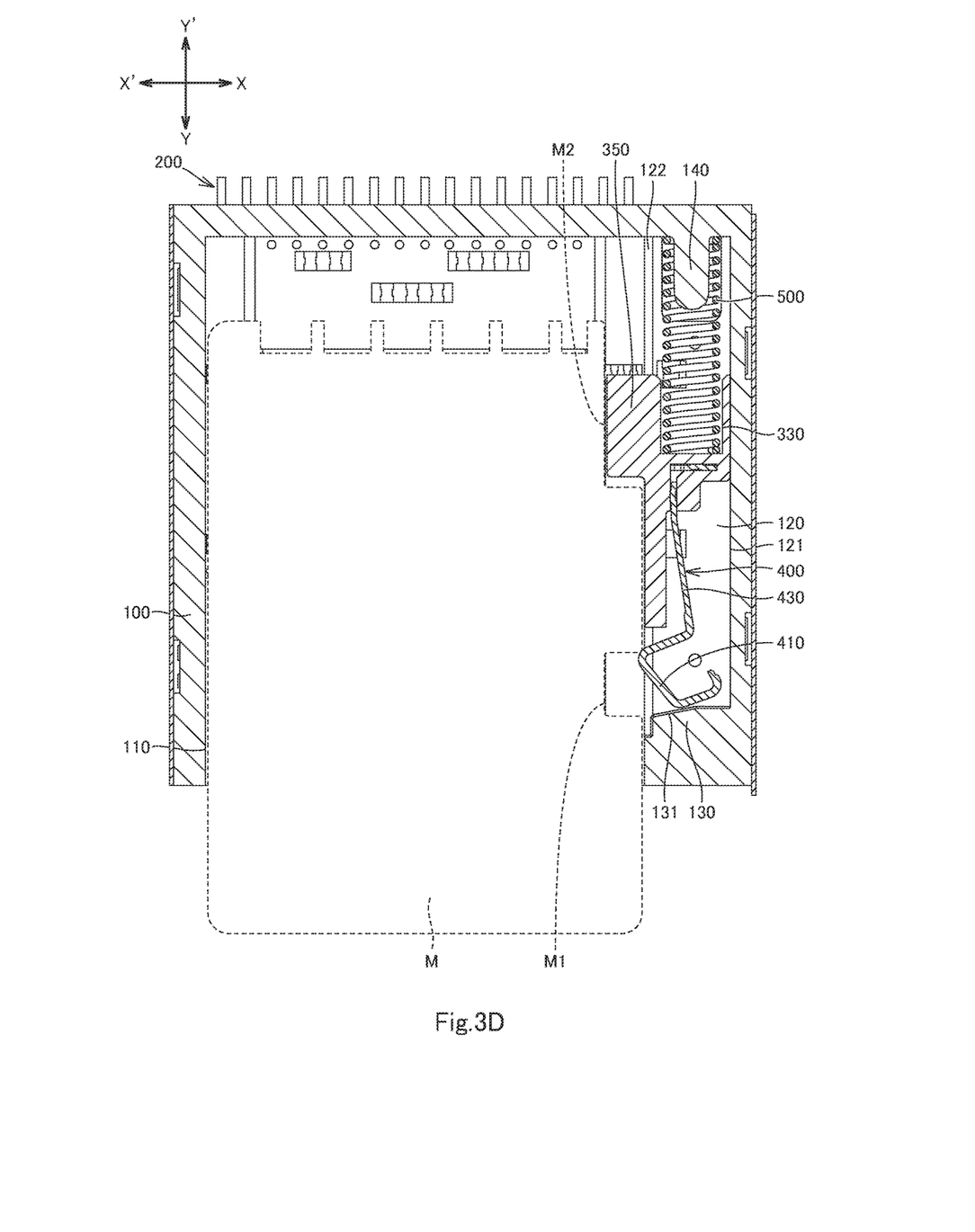
FIG. 3D is a cross-sectional view, taken along line 3A-3A in FIG. 1A, of the card connector and the card, with the slider located at the second position and with the engagement released between an engaging portion of the lock spring and an engaging recess of the card.
Figure 3E:
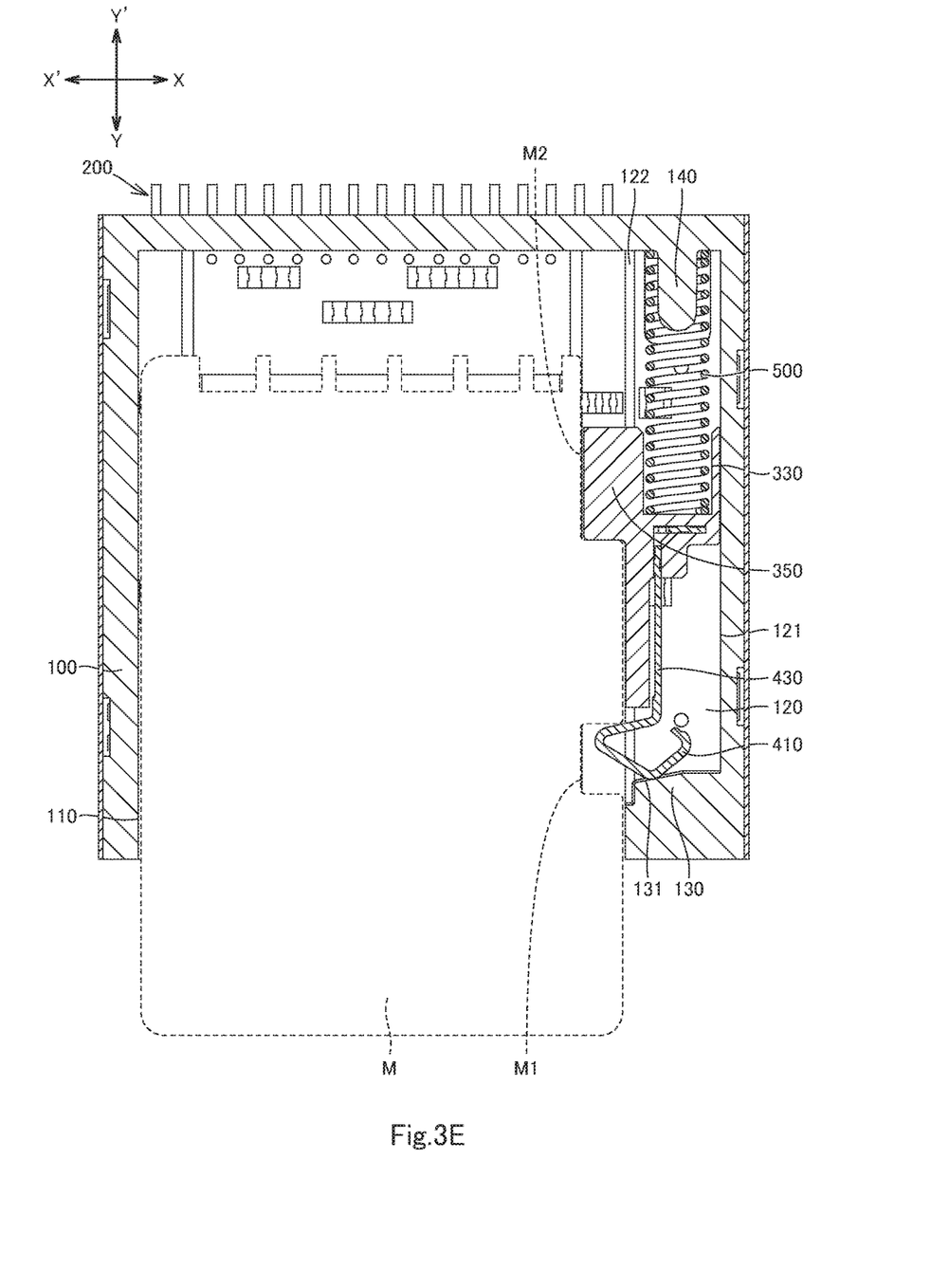
FIG. 3E is a cross-sectional view, taken along line 3A-3A in FIG. 1A, of the card connector and the card, with the slider located at the second position and with the engagement maintained between the engaging portion of the lock spring and the engaging recess of the card.

The engaging portion 410 may be configured to be elastically deformable when brought into abutment with the inclined face 131 of the abuttable portion 130. For example, the engaging portion 410 may be a flat spring or a plastic plate bent in a hook shape, or an elastic body of rubber or other material. In the former case, the portion other than the engaging portion 410 of the lock spring 400 may be a flat spring or a plastic plate integrally formed with the engaging portion 410, or may be a plastic member or an elastic body connected to the engaging portion 410. In the latter case, the portion other than the engaging portion 410 of the lock spring 400 may be an elastic body of rubber or other material integrally formed with the engaging portion 410, or may be a flat spring or a plastic member connected to the engaging portion 410. The engaging portion 410 may be configured to elastically deform such that the Y-Y' direction dimension of the engaging portion 410 decreases upon abutment. Alternatively, the engaging portion 410 may be configured to elastically deform such that the Y-Y' direction dimension of the engaging portion 410 decreases and the X-X' direction dimension of the engaging portion 410 increases upon abutment. FIG. 3E shows the latter case.

The engaging portion 410 may include a first inclined portion 411 (corresponding to the inclined portion in the claims). The first inclined portion 411 extends in the same direction as the inclining direction of the inclined face 131 of the abuttable portion 130. The first inclined portion 411 may be in surface-contact with the inclined face 131 of the abuttable portion 130.

The lock spring 400 may further include a base 420 and an intermediate portion 430. The base 420 is held by the holding portion 340 of the slider 300. The intermediate portion 430 extends in the Y-Y' direction from the base 420 to the engaging portion 410. When the engaging portion 410 is displaced in the X direction, the intermediate portion 430 elastically deforms in the X direction.

In FIGS. 3A to 3E, the lock spring 400 is constituted by a flat spring. The base 420 of the lock spring 400 is generally L-shaped and is press-fitted and held in the holding groove of the holding portion 340. The intermediate portion 430 of the lock spring 400 is a rectilinear plate extending in the Y-Y' direction along the X-direction-side face of the runner 320 and is elastically deformable in the X direction. The runner 320 limits the extent of elastic deformation in the X' direction of the intermediate portion 430. The engaging portion 410 of the lock spring 400 is bent in a hook shape. The engaging portion 410 includes the first inclined portion 411, a second inclined portion 412, and a joining portion 413. The second inclined portion 412 extends substantially parallel to the first inclined portion 411. The joining portion 413 interjoins the X'-direction-side end of the first inclined portion 411 and the X'-direction-side end of the second inclined portion 412. The corner where the second inclined portion 412 and the joining portion 413 meet is located inside the slot 110 and serves as a portion to engage with the engaging recess M1 of the card M. It is possible to omit the second inclined portion 412 and the joining portion 413.

It is preferable that the slider 300 further includes a projection 350. The projection 350 protrudes in the X' direction from the slider 300. The projection 350 is located inside the slot 110. The guide 122, if provided, may preferably have such a Z-Z' direction dimension that the guide 122 does not interfere with the projection 350, or may be provided with an opening for avoiding interference with the projection 350. In this case, the card M may further include a fitting recess M2 that can fit over the projection 350. The fitting recess M2 is provided at a corner at the X- and Y'-direction side of the card M and opens in the X and Y' directions. The fitting recess M2 may have a shape conforming to the outer shape of the projection 350. When the slider 300 is located at the second position, the projection 350 fits in the fitting recess M2. When the slider 300 moves from the second position to the first position, the projection 350 is pressed by the card M. In contrast, when an urging force of the urging member 500 causes the slider 300 to move from the first position to the second position, the projection 350 presses the card M. It should be appreciated that the projection 350 may be omitted if the slider 300 is movable together with the card M only by the engagement between the engaging portion 410 of the lock spring 400 and the engaging recess M1 of the card M.

The card connector C may further include a heart-cam mechanism H. The heart-cam mechanism H includes a pin H1 and a cam groove H2. The cam groove H2 is provided in the Z-direction-side face of the slider 300. The pin H1 is generally U-shaped and has first and second longitudinal ends. The first end of the pin H1 is rotatably supported by the Y-direction-side wall of the movement path 120 of the body 100. The second end of the pin H1 is received in the cam groove H2 such as to be movable inside the cam groove H2 in accordance with movement of the slider 300. The cam groove H2 is shaped such as to positionally fix the second end of the pin H1 when the slider 300 is pressed in the Y' direction beyond the first position, and such as to release the positional fixation of the second end when the slider 300 is pressed again in the Y' direction. If the card connector C is provided with the heart-cam mechanism H as described above, the slider 300 may move beyond the first position and up to the third position where the heart-cam mechanism H is positionally fixed or released. The third position is a position on the Y'-direction side relative to the first position. It should be noted that the heart-cam mechanism H may be omitted.

The card connector C may further include a cover 600. The cover 600 is attached to the body 100 and covers the movement path 120 at least from the Z-direction side. If the slot 110 of the body 100 opens in the Z direction, the cover 600 covers the slot 110 and the movement path 120. The cover 600 may include the urging member 500. For example, a portion of the cover 600 may be cut and bent toward the movement path 120. In this case, the urging member 500 forms a flat spring constituted by the portion of the cover 600. It should be noted that the cover 600 may be omitted.

The following is a detailed description of an assembling procedure of the card connector C illustrated in FIGS. 1A to 3E. The lock spring 400 and the slider 300 are prepared. The base 420 of the lock spring 400 is held by the holding portion 340 of the slider 300, the intermediate portion 430 of the lock spring 400 is disposed on the X-direction side relative to the runner 320 of the slider 300, and the engaging portion 410 of the lock spring 400 is made to protrude from the slider 300 in the X' direction. Then the urging member 500 is prepared. The Y-direction-side end portion of the urging member 500 is accommodated in the accommodating recess 330 of the slider 300. Then the body 100 and the plurality of terminals 200 are prepared. The terminals 200 are insert-molded inside the body 100, the contact portions 210 of the terminals 200 are disposed inside the slot 110, and the connection portions 220 of the terminals 200 protrude from the body 100 in the Y' direction. The column 140 of the body 100 is inserted into the Y'-direction-side end portion of the urging member 500, and the slider 300 and the lock spring 400 are accommodated in the movement path 120 of the body 100. At that time, the runner 310 of the slider 300 is disposed such as to be movable in the Y-Y' direction along the guide 121 of the movement path 120, and the runner 320 of the slider 300 is disposed such as to be movable the Y-Y' direction along the guide 122 of the movement path 120. Thereafter the pin H1 of the heart-cam mechanism H is prepared. The first end of the pin H1 is attached to the Y-direction-side wall of the movement path 120 of the body 100, and the second end of the pin H1 is brought into engagement with the cam groove H2 of the slider 300. Then the cover 600 is prepared. The cover 600 is attached to the body 100, so that the cover 600 covers the slot 110 and the movement path 120 of the body 100. The card connector C is thus assembled.

The following is a detailed description of a procedure of inserting a card M into the card connector C illustrated in FIGS. 1A to 3E. A user inserts a card M into the slot 110 of the card connector C. Then the projection 350 of the slider 300 located at the second position fits into the fitting recess M2 of the card M, and the engaging portion 410 of the lock spring 400 is brought into engagement with the engaging recess M1 of the card M (see FIG. 3C). Thereafter, when the card M is inserted further into the slot 110 of the card connector C, the slider 300 and the lock spring 400 move, together with the card M, from the second position, beyond the first position, and to the third position as illustrated in FIG. 3A. In other words, the card M moves, together with the slider 300, in the Y' direction from the discharge position beyond the connection position (see FIG. 3B). This results in that the heart-cam mechanism H positionally fixes the slider 300 at the first position. When the slider 300 is located at the first position and the card M is located at the connection position, the electrodes of the card M are brought into contact the respective contact portions 210 of the terminals 200 of the card connector C. In this manner, the card M is inserted into the slot 110 of the card connector C, and the card M is brought into connection with the card connector C.

The following is a detailed description of a procedure of discharging the card M from the card connector C illustrated in FIGS. 1A to 3E. A user presses the card M at the connection position in the Y' direction. Then the slider 300 moves from the first position to the third position, thereby releasing the positional fixation of the slider 300 with respect to the heart-cam mechanism H. When the card M is released, the urging force of the urging member 500 in the Y direction causes the slider 300 and the lock spring 400 to move from the first position to the second position. When the slider 300 is located at the second position, the first inclined portion 411 of the engaging portion 410 of the lock spring 400 is brought into surface-contact (brought into abutment) with the inclined face 131 of the abuttable portion 130 of the body 100.

In a case (see FIG. 3C) where the engaging portion 410 is brought into abutment with the inclined face 131 of the abuttable portion 130 of the body 100 with a first load in a predetermined range of any suitable values, a force is generated against the load on the inclined face 131, and the force acts on the engaging portion 410 in a direction having components of the Y' and X' directions. This force maintains surface-contact of the first inclined portion 411 of the engaging portion 410 with respect to the inclined face 131. This in turn prevents the engaging portion 410 from being displaced in the X direction and maintains the engagement between the engaging portion 410 and the engaging recess M1 of the card M. In this state, when the user withdraws the card M in the Y direction, the engaging portion 410 is pressed by the Y'-direction-side wall of the engaging recess M1 of the card M. This pressure means that the engaging portion 410 is subjected to a load in a direction including the components in the Y direction and the X direction is exerted on the engaging portion 410 from the wall in the Y' direction of the engaging recess M1 of the card M. This load causes the first inclined portion 411 of the engaging portion 410 to be displaced in the X direction along the inclined face 131 of the abuttable portion 130 as illustrated in FIG. 3D. This displacement results in disengagement of the engaging portion 410 from the engaging recess M1 of the card M. Therefore, the user can easily remove the card M from the slot 110.

In a case (see FIG. 3E) where the engaging portion 410 is brought into abutment with the inclined face 131 of the abuttable portion 130 of the body 100 with a second load equal to or larger than the predetermined range, the engaging portion 410 is elastically deformed. Also in this case, a force is generated against the load on the inclined face 131, and the force acts on the engaging portion 410 in a direction including components of the Y' and X' directions. This force maintains abutment of the first inclined portion 411 of the engaging portion 410 with respect to the inclined face 131. This in turn prevents displacement of the engaging portion 410 in the X direction and maintains the engagement between the engaging portion 410 and the engaging recess M1 of the card M. The card M is thus prevented from springing out of the slot 110. When the elastically deformed engaging portion 410 returns to the original shape, the slider 300 is located at the second position, and the first inclined portion 411 of the engaging portion 410 of the lock spring 400 is in surface-contact with the inclined face 131. In this state, the user can remove the card M as described above.

The card connector C as described above has the following technical features. First, the conventional card connector is configured to prevent the card from springing out by bringing the lock spring into abutment with the rib when the slider is located at a spring-out prevention position that is located on the Y-direction side relative to the second position. In contrast, the card connector C is configured to prevent a card M from springing out by bringing the lock spring 400 into abutment with the inclined face 131 of the abuttable portion 130 so as to prevent displacement of the engaging portion 410 of the lock spring 400 when the slider is located at the second position. In addition, when the slider 300 is located at the second position, the engaging portion 410 is subjected to a load from the card M and thereby displaced in the X direction. In this way the slider 300 is configured such as not to move in the Y direction beyond the second position, contributing to reduction of the Y-Y'-direction dimension of the card connector C. As a result, the card connector C is downsized.

Second, the card connector C has a simplified construction. This is because this card connector C has such a simple configuration to allow two operations in a state where the slider 300 is located at the second position: preventing a card M from spring-out and removing the card M.

Third, if the abuttable portion 130 is constituted by a portion of the body 100, the card connector C has a reduced number of components for the following reason. The essential and only one urging member of the card connector C is the urging member 500 for urging the slider 300 in the Y direction. The card connector C does not require another urging member, which is required in the conventional card connector, for pressing the slider back to the second position when the slider moves in the Y direction beyond the second position.

Fourth, if the engaging portion 410 includes the first inclined portion 411, such configuration facilitates displacement of the engaging portion 410 in the X direction along the inclined face 131 of the abuttable portion 130 when the engaging portion 410 is subjected to a load from a card M. This is because the first inclined portion 411 is inclined in substantially the same direction as the inclining direction of the inclined face 131, allowing the load from the card M to be transferred more easily from the first inclined portion 411 of the engaging portion 410 to the inclined face 131, and allowing a force against the load to act more effectively as a force for displacing the engaging portion 410 along the inclined face 131.

Fifth, it is possible to mitigate impact occurring when the engaging portion 410 of the lock spring 400 is brought into abutment with the abuttable portion 130 of the body 100. This is because the engaging portion 410 can elastically deform when brought into abutment with the abuttable portion 130.

It should be appreciated that the above card connector is not limited to the above embodiments but may be modified in any manner within the scope of the claims.

It should be appreciated that the materials, the shapes, the dimensions, the number, the positions, etc. of the elements of the card connector in the above embodiments are presented by way of example only and can be modified in any manner as long as the same functions can be fulfilled. The constituent features of the above embodiments can be combined in any possible manner. The first direction of the invention may be any direction as long as it is the insertion/removal direction of a card into or out of the slot of the card connector. One side of the first direction may be any direction as long as it is the card discharge direction. The second direction of the invention may be any direction as long as it crosses the first direction.

REFERENCE SIGNS LIST

C: card connector
  100: body
    110: slot
    120: movement path
      121: guide
      122: guide
    130: abuttable portion
      131: inclined face
    140: column
  200: terminal
    210: contact portion
    220: connection portion
  300: slider
    310: runner
    320: runner
    330: accommodating recess
    340: holding portion
    350: projection
  400: lock spring
    410: engaging portion
      411: first inclined portion (inclined portion of lock spring)
      412: second inclined portion
      413: joining portion
    420: base
    430: intermediate portion
  500: urging member
  H: heart-cam mechanism
    H1: pin
  H2: cam groove
  M: card
    M1: engaging recess
    M2: fitting recess

What is claimed is:

1. A card connector comprising:
a body, the body including:
  a slot for insertion and removal of a card along a first direction,
  a movement path extending in the first direction and being located on one side of a second direction relative to the slot, the second direction crossing the first direction, and
  an abuttable portion being provided inside the movement path and including an inclined face, the inclined face being inclined in a direction including components of one side of the first direction and the other side of the second direction;
a slider accommodated inside the movement path so as to be movable in the first direction, at least between a first position and a second position, the second position being located on the one side of the first direction relative to the first position;
an urging member to exert on the slider an urging force to the one side of the first direction; and
a lock spring being provided at the slider and movable in the first direction together with the slider, the lock spring including an engaging portion engageable with an engaging recess of the card, from the one side of the second direction, the lock spring being elastically deformable such that the engaging portion thereof is displaced to the one side of the second direction, wherein
when the urging force of the urging member causes the slider to move from the first position to the second position, the engaging portion is brought into abutment with the inclined face of the abuttable portion, and
when a load in a direction including components of the one side of the first direction and the one side of the second direction is exerted on the engaging portion from the card in a state where the slider is located at the second position and the engaging portion abuts the inclined face of the abuttable portion, the engaging portion is displaced to the one side of the second direction along the inclined face.

2. The card connector according to claim 1, wherein the engaging portion includes an inclined portion, the inclined portion being inclined in a direction that is substantially the same as an inclining direction of the inclined face and be configured to make surface-contact with the inclined face.

3. The card connector according to claim 1, wherein the engaging portion is elastically deformable when brought into abutment with the inclined face of the abuttable portion.

4. The card connector according to claim 1, wherein the engaging portion is configured such as not to elastically deform when brought into abutment with the inclined face of the abuttable portion with a first load, and to elastically deform when brought into abutment with the inclined face of the abuttable portion with a second load, the second load being equal to or larger than the first load.

5. The card connector according to claim 2, wherein
the engaging portion is configured such as not to elastically deform when the inclined portion of the engaging portion is brought into surface-contact with the inclined face of the abuttable portion with a first load,
the engaging portion is configured such as to elastically deform and the inclined portion is configured such as to be partly separated from the inclined face when the inclined portion of the engaging portion is brought into surface-contact with the inclined face of the abuttable portion with a second load, the second load being equal to or larger than the first load, and
the engaging portion as elastically deformed is configured to recover in such as to bring the inclined portion into contact with the inclined face.

6. The card connector according to claim 5, wherein the engaging portion is configured such that when the inclined portion of the engaging portion is brought, with the first load, into surface-contact with the inclined face of the abuttable portion, the engaging portion does not elastically deform to maintain surface-contact between the inclined portion of the engaging portion and the inclined face of the abuttable portion.

7. The card connector according to claim 1, wherein
when the urging force of the urging member causes the slider to move from the first position to the second position and brings the engaging portion into abutment with the inclined face of the abuttable portion, a force is generated against the load on the inclined face of the abutting portion and the force acts on the engaging portion in a direction including components of the other side of the first direction and the other side of the second direction, and
the state where the slider is located at the second position and the engaging portion abuts the inclined face of the abuttable portion is a state where the force against the load is not generated.

8. The card connector according to claim 4, wherein
when the engaging portion is brought, with the first load, into abutment with the inclined face of the abuttable portion, a force is generated against the load on the inclined face, and the force acts on the engaging portion in a direction including components of the other side of the first direction and the other side of the second direction, and
when the engaging portion is brought, with the second load, into abutment with the inclined face and elastically deform, a force is generated against the load on the inclined face, and the force acts on the engaging portion in the direction including the components of the other side of the first direction and the other side of the second direction.

9. The card connector according to claim 3, wherein the engaging portion is configured to elastically deform such as to reduce a dimension in the first direction of the engaging portion when the engaging portion is brought into abutment with the inclined face of the abuttable portion.

10. The card connector according to claim 3, wherein the engaging portion is configured to elastically deform such as to reduce a dimension in the first direction of the engaging portion and increase a dimension in the second direction of the engaging portion when the engaging portion is brought into abutment with the inclined face of the abuttable portion.

11. The card connector according to claim 2, wherein the engaging portion is elastically deformable when brought into abutment with the inclined face of the abuttable portion.

12. The card connector according to claim 2, wherein the engaging portion is configured such as not to elastically deform when brought into abutment with the inclined face of the abuttable portion with a first load, and to elastically deform when brought into abutment with the inclined face of the abuttable portion with a second load, the second load being equal to or larger than the first load.

13. The card connector according to claim 2, wherein
when the urging force of the urging member causes the slider to move from the first position to the second position and brings the engaging portion into abutment with the inclined face of the abuttable portion, a force is generated against the load on the inclined face of the abutting portion and the force acts on the engaging portion in a direction including components of the other side of the first direction and the other side of the second direction, and
the state where the slider is located at the second position and the engaging portion abuts the inclined face of the abuttable portion is a state where the force against the load is not generated.

14. The card connector according to claim 12, wherein
when the engaging portion is brought, with the first load, into abutment with the inclined face of the abuttable portion, a force is generated against the load on the inclined face, and the force acts on the engaging portion in a direction including components of the other side of the first direction and the other side of the second direction, and
when the engaging portion is brought, with the second load, into abutment with the inclined face and elastically deform, a force is generated against the load on the inclined face, and the force acts on the engaging portion in the direction including the components of the other side of the first direction and the other side of the second direction.

15. The card connector according to claim 4, wherein the engaging portion is configured to elastically deform such as to reduce a dimension in the first direction of the engaging portion when the engaging portion is brought into abutment with the inclined face of the abuttable portion.

16. The card connector according to claim 11, wherein the engaging portion is configured to elastically deform such as to reduce a dimension in the first direction of the engaging portion when the engaging portion is brought into abutment with the inclined face of the abuttable portion.

17. The card connector according to claim 12, wherein the engaging portion is configured to elastically deform such as to reduce a dimension in the first direction of the engaging portion when the engaging portion is brought into abutment with the inclined face of the abuttable portion.

18. The card connector according to claim 4, wherein the engaging portion is configured to elastically deform such as to reduce a dimension in the first direction of the engaging portion and increase a dimension in the second direction of the engaging portion when the engaging portion is brought into abutment with the inclined face of the abuttable portion.

19. The card connector according to claim 11, wherein the engaging portion is configured to elastically deform such as to reduce a dimension in the first direction of the engaging portion and increase a dimension in the second direction of the engaging portion when the engaging portion is brought into abutment with the inclined face of the abuttable portion.

20. The card connector according to claim 12, wherein the engaging portion is configured to elastically deform such as to reduce a dimension in the first direction of the engaging portion and increase a dimension in the second direction of the engaging portion when the engaging portion is brought into abutment with the inclined face of the abuttable portion.

\* \* \* \* \*